United States Patent
Mansouri et al.

(10) Patent No.: US 10,648,804 B2
(45) Date of Patent: May 12, 2020

(54) METHOD FOR DETECTING A BLOCKING OF A ROTOR OF A MOTOR DRIVING AN ACTUATOR MEMBER

(71) Applicant: SAFRAN ELECTRONICS & DEFENSE, Boulogne Billancourt (FR)

(72) Inventors: Badr Mansouri, Boulogne Billancourt (FR); Kamal Aouchiche, Boulogne Billancourt (FR)

(73) Assignee: Safran Electronics & Defense, Boulogne Billancourt (FR)

( * ) Notice: Subject to any disclaimer, the term of this patent is extended or adjusted under 35 U.S.C. 154(b) by 278 days.

(21) Appl. No.: 15/529,949

(22) PCT Filed: Dec. 1, 2015

(86) PCT No.: PCT/EP2015/078172
§ 371 (c)(1),
(2) Date: May 25, 2017

(87) PCT Pub. No.: WO2016/087424
PCT Pub. Date: Jun. 9, 2016

(65) Prior Publication Data
US 2017/0328709 A1    Nov. 16, 2017

(30) Foreign Application Priority Data
Dec. 1, 2014    (FR) .................... 14 61690

(51) Int. Cl.
*G01B 21/16*    (2006.01)
*E05F 15/40*    (2015.01)
(Continued)

(52) U.S. Cl.
CPC .............. *G01B 21/16* (2013.01); *E05F 15/40* (2015.01); *G01B 5/24* (2013.01); *H02H 7/0851* (2013.01)

(58) Field of Classification Search
CPC . G01B 11/00; G01B 9/00; G01B 5/00; H02H 7/00; H02H 9/00; H02H 11/00
See application file for complete search history.

(56) References Cited

U.S. PATENT DOCUMENTS

| 5,410,226 A * | 4/1995 | Sekiguchi | H02H 7/0851 318/266 |
| 2002/0190680 A1 * | 12/2002 | Gerbetz | H02H 7/0851 318/445 |

(Continued)

FOREIGN PATENT DOCUMENTS

| DE | 44 01 463 A1 | 7/1994 |
| DE | 20 2005 019464 U1 | 4/2007 |
| EP | 0 047 812 A2 | 3/1982 |

*Primary Examiner* — Eduardo Colon Santana
*Assistant Examiner* — Said Bouziane
(74) *Attorney, Agent, or Firm* — Muncy, Geissler, Olds & Lowe, P.C.

(57) ABSTRACT

A method of detecting blocking of a rotor of a motor driving an actuator member with movement in translation between a first abutment and a second abutment, the method comprising the steps of, during an angular movement of the rotor, estimating at least a position (X) of the actuator member relative to the two abutments, a travel direction of the actuator member relative to the two abutments, and also a travel speed (V) of the actuator member; and on the basis at least of the estimated position of the actuator member, of the estimated travel direction of the actuator member, and of the estimated travel speed of the actuator member, detecting blocking of the rotor.

13 Claims, 3 Drawing Sheets

(51) Int. Cl.
*H02H 7/085* (2006.01)
*G01B 5/24* (2006.01)

(56) References Cited

U.S. PATENT DOCUMENTS

| | | | |
|---|---|---|---|
| 2003/0115803 A1* | 6/2003 | Kidokoro | E05F 15/40 49/28 |
| 2009/0211822 A1* | 8/2009 | Gears | H02P 29/0241 180/6.5 |

* cited by examiner

METHOD FOR DETECTING A BLOCKING OF A ROTOR OF A MOTOR DRIVING AN ACTUATOR MEMBER

The invention relates to a method of detecting the blocking of a rotor of a motor driving an actuator member.

TECHNOLOGICAL BACKGROUND OF THE INVENTION

In an aircraft, various movable elements such as control surfaces or indeed the cowl of a thrust reverser are associated with actuator members in order to be moved between a neutral position and an active position. For this purpose, the actuator members are driven by a motor to move in translation between two abutments. By way of example, for a flap, a first abutment is associated with the neutral position of the movable element, and a second abutment is associated with the active position of the movable element. Under such circumstances, when the motor is powered, it drives the actuator members that in turn move the associated movable members.

Nevertheless, the rotor of the motor might be subjected to mechanical blocking. In spite of the blocking, the electrical power that is delivered to the motor remains identical, thereby leading to overheating of the motor, and in particular of its power electronics. This can lead to degradation of the motor.

One solution would be to design the power electronics of the motor in such a manner as to enable it to withstand overheating as a result of the rotor being blocked. However, that would lead to an increase in the weight and in the size of the power electronics, which is not desirable in the field of aviation.

Another solution would be to detect overheating by means of a thermal relay. Nevertheless, such a relay presents a response time that is relatively long and therefore does not enable overheating to be detected quickly. The power electronics could thus still be damaged in spite of the presence of the relay. Furthermore, the relay does not make it possible to distinguish between a problem of overheating due to a genuine blockage of the rotor, and a problem of overheating due to some other reason. Any action taken after the relay has detected overheating might therefore not be appropriate.

Object of the Invention

An object of the invention is to propose a method of detecting the blocking of a motor that drives an actuator member, which method makes it possible to detect blocking of the rotor of said motor more effectively.

BRIEF SUMMARY OF THE INVENTION

In order to achieve this object, the invention provides a method of detecting blocking of a rotor of a motor driving an actuator member to move in translation between first and second abutments that are respectively representative of first and second angular positions and a second angular position of the rotor, the method comprising the steps of:
 during angular movement of the rotor, estimating at least a position of the actuator member relative to the two abutments, a travel direction of the actuator member relative to the two abutments, and also a travel speed of the actuator member;
 on the basis at least of the estimated position of the actuator member, of the estimated travel direction of the actuator member, and of the estimated travel speed of the actuator member, detecting:
  blocking of the rotor due to the actuator member reaching the first abutment; or
  blocking of the rotor due to the actuator member reaching the second abutment; or
  blocking of the rotor due to seizing during travel of the actuator member towards the first abutment; or
  blocking of the rotor due to seizing during travel of the actuator member towards the second abutment.

As a result of continuously observing parameters that are easily measured or quantified, the method of the invention makes it possible not only to detect any blocking of the rotor quickly, but also to estimate whether the blocking is due to seizing or to coming into abutment. Consequently, it is possible to respond quickly with different actions depending on the type of blocking that has been detected.

The method of the invention thus makes it possible to detect blocking of the rotor of the motor in a manner that is effective.

Furthermore, the method of the invention may be performed by means that require maintenance costs that are low compared with a thermal relay or with oversized power electronics for the motor.

Advantageously, the method of the invention makes it possible to detect blocking of a motor driving an actuator member associated with one or more movable elements that are subjected to forces that vary over time and position (as a function of the position of the movable element). For example, when the movable element is a movable outside portion of an aircraft (thrust reversal cowl, control surface, aileron, . . . ), said movable element is subjected to aerodynamic loads that vary in time and in position.

For the present application, when mention is made of data characteristic of the actuator member, such as for example the position of the actuator member, that can apply equally well to data that is actually associated with the actuator member, such as the actual position of the actuator member, or to data that is representative of the actuator member, but that is actually associated with the rotor, such as the actual angular position of the rotor, which is in fact representative of the actual position of the actuator member as a result of the connection between the actuator member and the rotor.

BRIEF DESCRIPTION OF THE DRAWINGS

The invention can be better understood in the light of the following description of a particular, non-limiting implementation of the invention. Reference is made to the accompanying figures, in which.

DETAILED DESCRIPTION OF THE INVENTION

Figure 1:
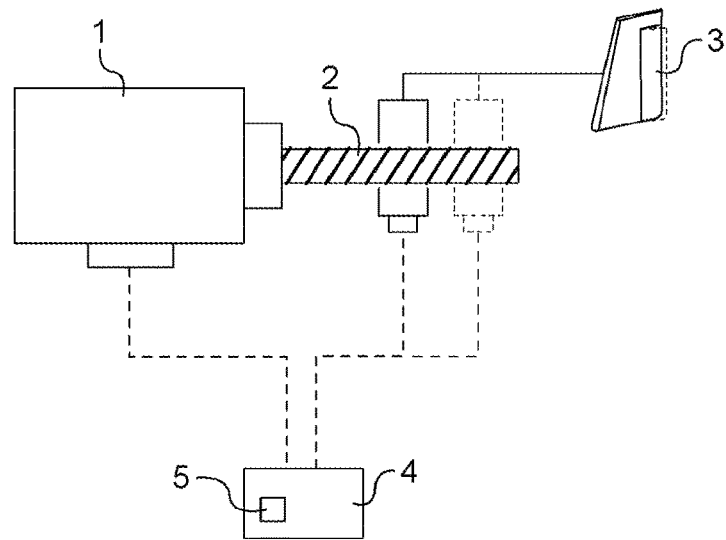
FIG. 1 is a diagrammatic view of a control surface, of an actuator member, and of a motor associated with said control surface, together with control means for the motor enabling the method of the invention to be performed.
Figure 2:
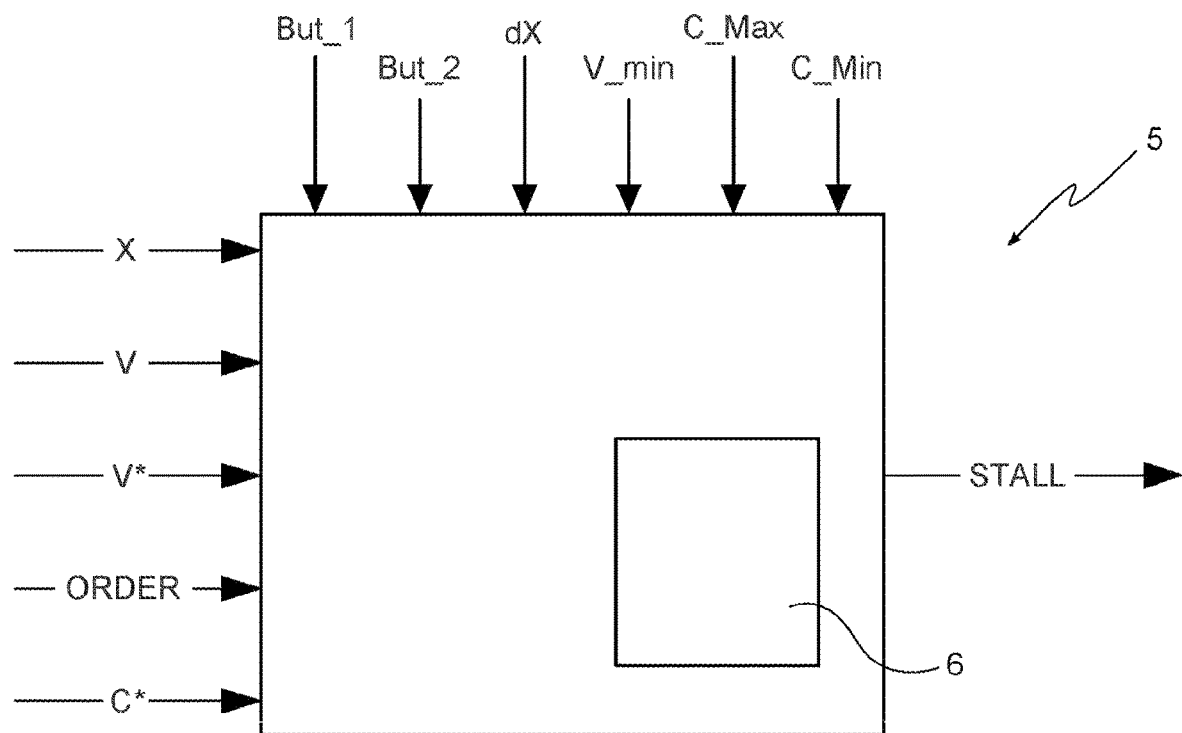
FIG. 2 is a diagrammatic view of a detector module of the control means shown in FIG. 1.

With reference to FIGS. 1 and 2, the detection method of the invention is used in this example to detect blocking of a rotor of a motor 1 driving an actuator member 2 for actuating a control surface 3 of an aircraft. Naturally, this application is not limiting, and the method of the invention may be implemented to detect blocking of a rotor of a motor driving an actuator member associated with some other movable element, such as for example the cowl of a thrust reverser of an aircraft.

In this example, the motor 1 is a permanent magnet synchronous machine.

In known manner, the actuator member 2 is for moving the control surface 3 between two extreme positions. For this purpose, the actuator member 2 is associated with the motor 1 so as to be driven by said motor 1 to move in translation between a first abutment and a second abutment, such that:
 when the actuator member 2 is at the first abutment, the control surface 3 is in its first extreme position, with the respective positions of the actuator member 2 and of the control surface 3 then being drawn in continuous lines; and
 when the actuator member 2 is at the second abutment, the control surface 3 is in its second extreme position, with the respective positions of the actuator member 2 and of the control surface 3 then being drawn in dashed lines.

The first abutment and the second abutment are representative respectively of a first angular position and of a second angular position of the rotor of the motor 1.

As a result, when the motor 1 is powered, it drives the actuator member 2, which in turn moves the control surface 3.

Furthermore, the motor 1 is associated with control means 4 for controlling the motor 1. In order to detect blocking of the rotor, during angular movement of the rotor, the control means 4 include a detector module 5 for detecting blocking of the rotor.

For this purpose, whenever the rotor is moving angularly, the detector module 5 receives the following data from the control means 4: the position X of the actuator member 2 relative to the two abutments; the travel direction of the actuator member 2 relative to said abutments; and the travel speed V of the actuator member 2. By way of example, the position X of the actuator member 2 and the travel speed V of the actuator member 2 are measured by sensors connected to the control means 4. In a variant, the position X of the actuator member 2 and the travel speed V of the actuator member 2 are deduced from corresponding data associated with the motor, which data may be supplied by a resolver of the control means 4, for example.

In this example, the information about the travel direction of the actuator member 2 is transmitted to the detector module 5 via an ORDER variable that takes the value GO when the actuator member 2 is moving towards the second abutment, and that takes the value BACK when the actuator member 2 is moving towards the first abutment. The value of the variable ORDER is modified by the control means 4 depending on the setpoints applied to the motor 1.

In particular manner, throughout the angular movement of the rotor, the detector module 5 also receives the travel speed setpoint data V* from the actuator member, which is transmitted thereto by the control means 4.

Furthermore, in this example, throughout the angular movement of the rotor, the detector module 5 receives the setpoint data C* for the mechanical torque to be delivered to the actuator member 2, which data is transmitted to the detector module by the control means 4.

Furthermore, the positions of the first abutment But_1 and of the second abutment But_2 are stored in the detector module 5. In this example, the position of the first abutment But_1 corresponds to zero and the position of the second abutment But_2 corresponds to a positive value other than zero.

Furthermore, in this example, a minimum travel speed threshold V_min for the actuator member 2 is stored in the detector module 5. Specifically, if the actuator member 2 travels too slowly, that can lead to overheating of the motor 1, which might damage it. Said minimum travel speed threshold V_min is thus predetermined so as to avoid an excessive temperature rise of the motor 1.

In the same manner, in this example, a maximum mechanical torque threshold C_max for delivery to the actuator member 2 is stored in the detector module 5. Furthermore, a minimum mechanical torque threshold C_min for delivery to the actuator member 2 is also stored in the detector module 5. Specifically, it should be recalled that the actuator member 2 is movable reversibly between two abutments. The mechanical torque setpoint is thus positive when the actuator member 2 is moving towards the second abutment, and must thus be less than C_max, and it is negative when the actuator member 2 is traveling towards the first abutment, and must thus be greater than C_min (which is a negative value).

These mechanical torque thresholds are predetermined so as to avoid mechanical damage to the motor 1 or to the actuator member 2, e.g. as a result of too great a demand on said motor 1 or on the actuator member 2.

In addition, a position uncertainty dX is stored in the detector module 5. This position uncertainty dX defines a position error of the actuator member 2 relative to the position X, and in particular it is predetermined so as to take into consideration inaccuracy concerning the measurement of the position dX by the sensor.

This data concerning position X, travel direction ORDER, travel speed V, travel speed setpoint V*, mechanical torque setpoint C*, position of the first abutment But_1, position of the second abutment But_2, and also the values of the minimum travel speed threshold V_min, the maximum mechanical torque threshold C_max, the minimum mechanical torque threshold C_min, and the position uncertainty dX serves to enable the detector module 5 to detect blocking of the rotor and also to determine whether the blocking is due to the actuator member 2 coming into abutment or due to seizing of the motor 1 or of the actuator member 2. More precisely, the detector module 5 is configured to determine whether the blocking is due to the actuator member 2 reaching the first abutment, or is due to the actuator member 2 reaching the second abutment, or is due to seizing during travel of the actuator member 2 towards the first abutment, or is due to seizing during travel of the actuator member 2 towards the second abutment.

In a particular implementation, the detector module 5 includes indexing means 6 generating a STALL variable for use by the control means 4 by causing said STALL variable to take a particular value depending on the type of blocking that has been detected, as described below.

During angular movement of the rotor, so long as blocking has not been detected, the indexing means 6 maintain the STALL variable at 0.

Figure 3:
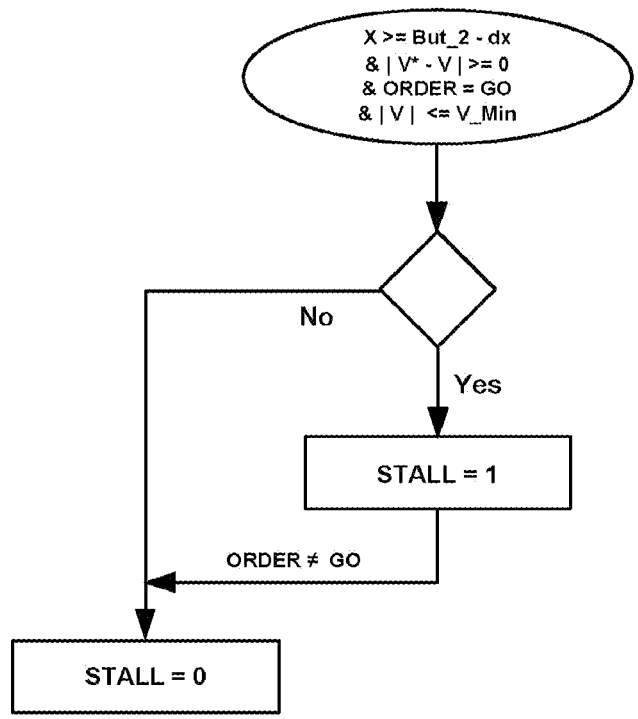
FIG. 3 is a flow chart associated with the detector module shown in FIG. 2 and showing a first detection of a rotor of the motor blocking, due to the actuator member reaching the first abutment.

With reference to FIG. 3, the detector module 5 detects blocking of the rotor due to the actuator member 2 reaching the second abutment:
- if the position of the actuator member 2 is significantly greater than or equal to the position of the second abutment But_2, i.e. in this example if the position X of the actuator member 2 is greater than or equal to the position of the second abutment But_2 minus the position uncertainty dX; and
- if the absolute value of the difference between the travel speed setpoint V* and the travel speed V is greater than or equal to zero; and
- if the absolute value of the travel speed V is less than or equal to the minimum travel speed threshold V_min; and
- if the travel order to the actuator member towards the second abutment is active, i.e. if the ORDER variable is equal to GO.

Under such circumstances, the indexing means 6 increment the value of the STALL variable so that the STALL variable becomes 1.

So long as the order to move towards the second abutment is active, i.e. so long as the ORDER variable is equal to GO, the STALL variable remains at 1.

When the order to move towards the second abutment is no longer active, i.e. if the ORDER variable is not equal to GO, then the indexing means 6 modify the value of the STALL variable so that it once more becomes 0. The detector module 5 is thus ready to detect new blocking of the rotor.

Figure 4:
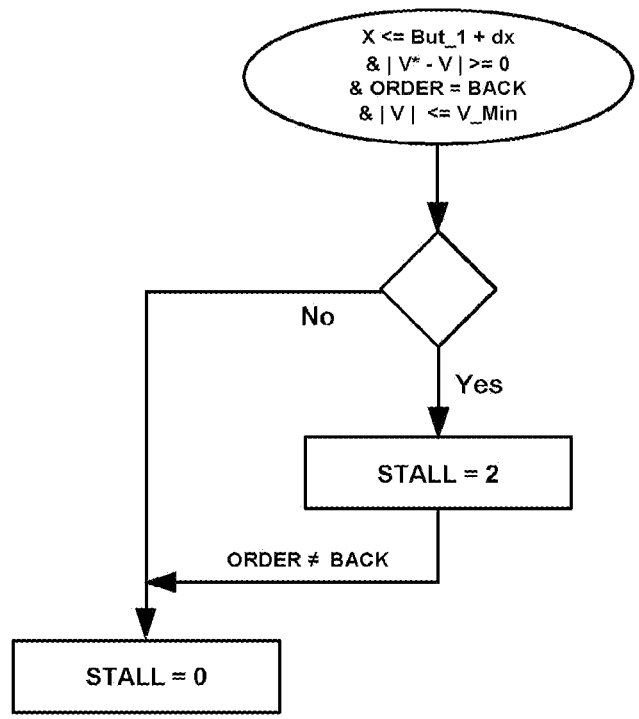
FIG. 4 is a flow chart analogous to FIG. 3 showing a second detection of the rotor of the motor blocking, due to the actuator member reaching the second abutment.

With reference to FIG. 4, the detector module 5 detects blocking of the rotor due to the actuator member 2 reaching the first abutment:
- if the position of the actuator member 2 is substantially less than or equal to the position of the first abutment But_1, i.e. in this example, if the position of the actuator member 2 is less than or equal to the position of the first abutment But_1 plus the position uncertainty dX; and
- if the absolute value of the difference between the travel speed setpoint V* and the travel speed V is greater than or equal to zero; and
- if the absolute value of the travel speed V is less than or equal to the minimum travel speed threshold V_min; and
- if an order to move the actuator member 2 towards the first abutment is active, i.e. if the ORDER variable is equal to BACK.

Under such circumstances, the indexing means 6 increment the value of the STALL variable so that the STALL variable becomes 2.

So long as the order to move towards the first abutment is active, i.e. so long as the ORDER variable is equal to BACK, the STALL variable remains at 2.

When the order to move towards the first abutment is no longer active, i.e. when the ORDER variable is no longer equal to BACK, the indexing means 6 modify the value of the STALL variable so that it is once more equal to 0. The detector module 5 is thus ready to detect new blocking of the rotor.

Figure 5:
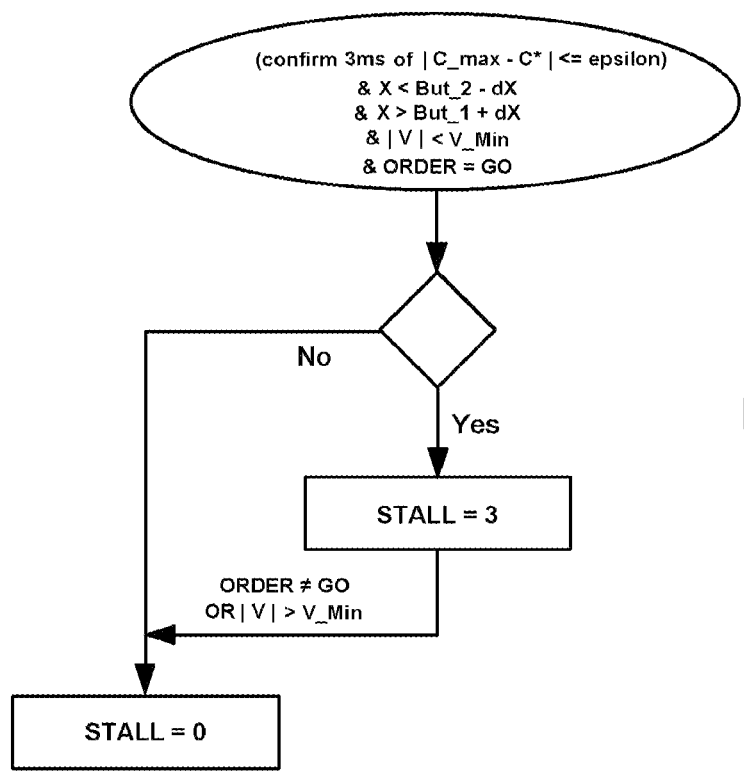
FIG. 5 is a flow chart analogous to FIG. 3 showing a third detection of the rotor of the motor blocking, due to seizing while the actuator member is moving towards the first abutment.

With reference to FIG. 5, the detector module 5 detects blocking of the motor due to seizing while the actuator member 2 is moving towards the second abutment:
- if the absolute value of the difference between the maximum torque threshold C_max and the torque setpoint C* is substantially zero over at least a given time interval, e.g. in this example over a time interval of at least 3 milliseconds (ms);
- if the position X is substantially less than the position of the second abutment But_2 and substantially greater than the position of the first abutment But_1, i.e. in this example if the position X is less than the position of the second abutment But_2 minus the position uncertainty dX and greater than the position of the first abutment But_1 plus the position uncertainty dX; and
- if the absolute value of the travel speed V is less than the minimum travel speed threshold V_min; and
- if an order to move the actuator member 2 towards the second abutment is active, i.e. if the ORDER variable is equal to GO.

Under such circumstances, the indexing means 6 increment the value of the STALL variable so that the STALL variable becomes 3.

So long as the order to move towards the second abutment is active, i.e. the ORDER variable is equal to GO, and so long as the absolute value of the travel speed V remains less than the minimum travel speed threshold V_min, the STALL variable remains at 3.

When the order to move towards the second abutment is no longer active, i.e. when the ORDER variable is no longer equal to GO, the indexing means 6 modify the value of the STALL variable so that it is once more equal to 0. Furthermore, when the absolute value of the travel speed V becomes greater than the minimum travel speed threshold V_min, the indexing means 6 modify the value of the STALL variable so that it is once more equal to 0.

In both situations, the detector module 5 is ready to detect new blocking of the rotor.

Figure 6:
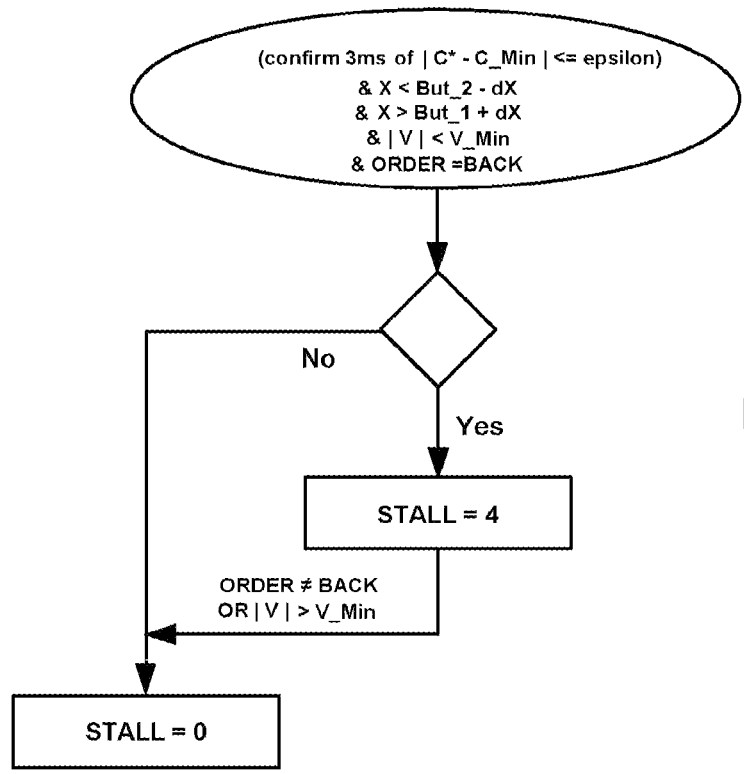
FIG. 6 is a flow chart analogous to FIG. 3 showing a fourth detection of the rotor of the motor blocking, due to seizing while the actuator member is moving towards the second abutment.

Finally, with reference to FIG. 6, the detector module 5 detects blocking of the rotor due to seizing during movement of the actuator member 2 towards the first abutment:
- if the absolute value of the difference between the minimum torque threshold C_min and the torque setpoint C* is substantially zero for at least a given time interval, which in this example is equal to 3 ms; and
- if the position X is substantially less than the position of the second abutment But_2 and substantially greater than the position of the first abutment But_1, i.e., in this example, if the position X is less than the position of the second abutment But_2 minus the position uncertainty dX and greater than the position of the first abutment But_1 plus the position uncertainty; and
- if the absolute value of the travel speed V is less than the minimum travel speed threshold V_min; and
- if an order to move the actuator member towards the first abutment is active, i.e. if the ORDER variable is equal to BACK.

Under such circumstances, the indexing means 6 increment the value of the STALL variable so that the STALL variable becomes 4.

So long as the order to move towards the first abutment is active, i.e. the ORDER variable is equal to BACK, and so long as the absolute value of the travel speed V remains less than the minimum travel speed threshold V_min, the STALL variable remains at 4.

When the order to move towards the first abutment is no longer active, i.e. when the ORDER variable is no longer equal to BACK, the indexing means 6 modify the value of the STALL variable so that it is once more equal to zero. Furthermore, when the absolute value of the travel speed V is greater than the minimum travel speed threshold V_min, the indexing means 6 modify the value of the STALL variable so that it is once more equal to 0.

In both situations, the detector module 5 is once more ready to detect new blocking of the rotor.

As a result, on the basis of simple data items that are easily determined or measured, the detector module 5 can determine quickly and effectively that blocking has occurred and can even determine the cause of the blocking.

Advantageously, the indexing means 6 make it possible to indicate clearly and quickly to the control means 4 the type of the blocking that has been detected. It is then possible for the control means 4 to act appropriately depending on the value taken by the STALL variable.

In a particular implementation, the control means 4 are thus arranged to act, whenever it has been detected that the rotor is blocked as a result of the actuator member 2 reaching the first abutment or the second abutment, i.e. whenever the STALL variable generated by the indexing means is equal to 1 or 2.

Preferably, when the STALL variable is equal to 1 or 2, the control means 4 control the motor 1 so as to lead to fictitious braking of the actuator member 2.

In particular manner, in this example, the control means 4 reduce the value of the maximum torque threshold C_max when the STALL variable is equal to 1. The maximum torque threshold C_max in this example is reduced so that the motor 1 can nevertheless maintain the control surface 3 in its extreme position by using the actuator member 2 to oppose aerodynamic forces, in particular.

Because of this reduction in the maximum torque C_max that may be transmitted to the actuator member 2, the motor 1 is powered with less power. As a result, even though the actuator member 2 remains in abutment over a relatively long length of time, there is no excessive overheating of the motor 1.

Likewise, in this example, the control means 4 increase the value of the minimum torque threshold C_min (a negative value) when the STALL variable is equal to 2. In this example, the minimum torque threshold C_min is increased so that the motor 1 manages nevertheless to keep the control surface 3 in its extreme position by using the actuator member 2 to oppose aerodynamic forces, in particular. In a particular implementation, the control means 4 are also arranged to act when it is detected that the rotor is blocked as a result of seizing, i.e. when the STALL variable generated by the indexing means 6 is equal to 3 or 4.

In particular manner, when the STALL variable is equal to 3 or 4, the control means 4 control the motor 1 by requesting the rotor to perform successive small angular movements through small amplitudes in one direction of rotation and then in the other direction of rotation, corresponding to ordering successive go-and-return movements of the actuator member 2 through small amplitudes, in order to release the motor 1 and/or the actuator member 2.

Naturally, the invention is not limited to the implementation described, and variant implementations may be applied thereto without going beyond the ambit of the invention.

In particular, although in this example use is made directly of measurements of the travel and the position of the actuator member in order to detect blocking, it is possible to detect blocking by having recourse to models that are representative of the movement of the actuator member. For example, the model may serve to model the angular movement of the rotor between its first angular position and its second angular position by a movement in translation of a body having the same inertia as the rotor between two abutments, each abutment being representative of a respective abutment of the actuator member. Models could also be used to determine the thresholds used by the method of the invention such as the minimum speed threshold. Although use is made in this example of data associated with the actuator member, the method of the invention could be implemented using data associated with the rotor and representative of data associated with the actuator member. Once more, in the present application, when reference is made to data that is characteristic of the actuator member, such as the mechanical torque setpoint for transmitting to the actuator member, that could equally well be data that is associated with the actuator member, namely a real setpoint for the mechanical torque to be transmitted to the actuator member, or data that is representative of the actuator member but that is associated with the rotor, such as a setpoint for the electromagnetic torque to be delivered to the rotor and that is representative of the setpoint for the mechanical torque to be transmitted to the actuator member. Thus, data associated with the motor and representative of data associated with the actuator member may be supplied by a resolver of the motor.

Although in this example the motor is controlled requesting the rotor to perform successive small amplitude angular movements in one direction of rotation and then in the other direction of rotation in order to unblock the rotor in the event of seizing, it is possible in a variant, or in addition, to control the motor in some other way in an attempt to unblock the rotor in the event of seizing. For example, the maximum mechanical torque threshold for transmission to the actuator member could be increased during a predetermined time interval, e.g. 3 ms (or conversely the minimum mechanical torque threshold to be transmitted to the actuator member, which threshold is negative, could be decreased during a predetermined time interval, e.g. 3 ms). It is also possible to switch off the electrical power supply to the motor in order to avoid damaging the motor and/or the actuator member as a result of seizing. For example, if neither causing the rotor to perform successive small movements in rotation in both directions of rotation, nor temporarily increasing the absolute maximum torque enable the rotor to be unblocked, then the electrical power supply to the motor may be cut off.

Although in the present example there is only one minimum travel speed threshold, there could be two minimum travel speed thresholds, and particularly, but not exclusively, in the event of maximum and minimum torque thresholds being modified when the actuator member is in abutment or close to the abutments: there could be a first minimum travel speed threshold for when the actuator member is traveling towards one or the other of its abutments, and a second minimum travel speed threshold for when the actuator member is already in abutment or in the proximity of its abutment. The first threshold should then be used for detecting blocking of the rotor due to seizing, and the second threshold for detecting blocking of the rotor due to the actuator member coming into abutment.

Although in this example the values for the torque threshold are modified only when the actuator member is in abutment, said values could be modified all along the travel of the actuator member in order to brake said travel progressively on approaching the abutment.

The invention claimed is:

1. A method of detecting blocking of a rotor of a motor driving an actuator member to move in translation between first and second abutments that are respectively representative of first and second angular positions of the rotor, the method comprising the steps of:
   in a first step, during angular movement of the rotor, estimating at least a position of the actuator member relative to the two abutments, a travel direction of the actuator member relative to the two abutments, and also a travel speed of the actuator member;
   in a second step, on the basis at least of the estimated position of the actuator member, of the estimated travel direction of the actuator member, and of the estimated travel speed of the actuator member, detecting:
      blocking of the rotor due to the actuator member reaching the first abutment; or
      blocking of the rotor due to the actuator member reaching the second abutment; or
      blocking of the rotor due to seizing during travel of the actuator member towards the first abutment; or
      blocking of the rotor due to seizing during travel of the actuator member towards the second abutment;
   the second step being implemented on the basis of a setpoint data for the mechanical torque to be delivered to the actuator member, said setpoint data being positive and must be less than a maximum mechanical torque threshold when the actuator member is moving towards one of the abutment and said setpoint data being negative and must be greater than a minimum mechanical torque threshold when the actuator member is moving towards the other of the abutment, these mechanical torque thresholds being predetermined so as to avoid mechanical damage to the motor or to the actuator member.

2. The method according to claim 1, wherein blocking of the rotor due to the actuator member reaching the second abutment is detected:
   if the position of the actuator member is substantially greater than or equal to the position of the second abutment; and
   if an absolute value of the difference between a travel speed setpoint for the actuator member and the travel speed of the actuator member is greater than or equal to zero; and
   if the absolute value of the travel speed of the actuator member is less than or equal to a predetermined minimum travel speed threshold; and
   if an order for movement of the actuator member towards the second abutment is active, which order is representative of the travel direction of the actuator member.

3. The method according to claim 1, wherein blocking of the rotor due to the actuator member reaching the first abutment is detected:
   if the position of the actuator member is substantially less than or equal to the position of the first abutment; and
   if an absolute value of the difference between a travel speed setpoint for the actuator member and the travel speed of the actuator member is greater than or equal to zero; and
   if the absolute value of the travel speed of the actuator member is less than or equal to a predetermined minimum travel speed threshold; and
   if an order for movement of the actuator member towards the first abutment is active, which order is representative of the travel direction of the actuator member.

4. The method according to claim 1, wherein blocking of the rotor due to seizing during travel of the actuator member towards the second abutment is detected:
   if the position of the actuator member is substantially less than the position of the second abutment and substantially greater than the position of the first abutment; and
   if an absolute value of the travel speed of the actuator member is less than a predetermined minimum travel speed threshold; and
   if an absolute value of the difference between a predetermined maximum torque threshold and a torque setpoint for transmitting to the actuator member is substantially zero for at least a predetermined time interval; and
   if an order to move the actuator member towards the second abutment is active, which order is representative of a travel direction of the actuator member.

5. The method according to claim 1, wherein blocking of the rotor due to seizing during travel of the actuator member towards the first abutment is detected:
   if the position of the actuator member is substantially less than the position of the second abutment and substantially greater than the position of the first abutment; and
   if an absolute value of the travel speed of the actuator member is less than a predetermined minimum travel speed threshold; and
   if an absolute value of the difference between a predetermined minimum torque threshold and a torque setpoint for transmitting to the actuator member is substantially zero for at least a predetermined time interval, the predetermined minimum torque threshold being a negative value; and
   if an order to move the actuator member towards the first abutment is active, which order is representative of a travel direction of the actuator member.

6. The method according to claim 1, further including a step of releasing the rotor when it is detected that blocking is due to seizing.

7. The method according to claim 6, wherein during the step of releasing the rotor, the rotor is controlled to perform angular movements of small amplitude successively in one direction of rotation and then in the other direction of rotation of the rotor.

8. The method according to claim 6, wherein during the step of releasing the rotor, a maximum mechanical torque threshold for transmitting to the actuator member is increased during a predetermined time interval, respectively minimum mechanical torque threshold for transmitting to the actuator member is decreased during a predetermined time interval, minimum mechanical torque threshold being negative value.

9. The method according to claim 6, wherein during the step of releasing the rotor, the power supply to the motor is cut off.

10. The method according to claim 1, wherein a maximum mechanical torque threshold, of positive value, for transmitting to the actuator member is reduced when it is detected that blocking is due to the actuator member coming into abutment.

11. The method according to claim 1, wherein a minimum mechanical torque threshold, of negative value, for transmitting to the actuator member is increased when it is detected that blocking is due to the actuator member coming into abutment.

12. A method of detecting blocking of a rotor of a motor driving an actuator member to move in translation between first and second abutments that are respectively representative of first and second angular positions of the rotor, the method comprising the steps of:
- during angular movement of the rotor, estimating at least a position of the actuator member relative to the two abutments, a travel direction of the actuator member relative to the two abutments, and also a travel speed of the actuator member;
- on the basis at least of the estimated position of the actuator member, of the estimated travel direction of the actuator member, and of the estimated travel speed of the actuator member, detecting:
  - blocking of the rotor due to the actuator member reaching the first abutment; or
  - blocking of the rotor due to the actuator member reaching the second abutment; or
  - blocking of the rotor due to seizing during travel of the actuator member towards the first abutment; or
  - blocking of the rotor due to seizing during travel of the actuator member towards the second abutment,
- wherein blocking of the rotor due to seizing during travel of the actuator member towards the second abutment is detected:
- if the position of the actuator member is substantially less than the position of the second abutment and substantially greater than the position of the first abutment; and
- if an absolute value of the travel speed of the actuator member is less than a predetermined minimum travel speed threshold; and
- if an absolute value of the difference between predetermined maximum torque threshold and torque setpoint for transmitting to the actuator member is substantially zero for at least a predetermined time interval; and
- if an order to move the actuator member towards the second abutment is active, which order is representative of a travel direction of the actuator member.

13. A method of detecting blocking of a rotor of a motor driving an actuator member to move in translation between first and second abutments that are respectively representative of first and second angular positions of the rotor, the method comprising the steps of:
- during angular movement of the rotor, estimating at least a position of the actuator member relative to the two abutments, a travel direction of the actuator member relative to the two abutments, and also a travel speed of the actuator member;
- on the basis at least of the estimated position of the actuator member, of the estimated travel direction of the actuator member, and of the estimated travel speed of the actuator member, detecting:
  - blocking of the rotor due to the actuator member reaching the first abutment; or
  - blocking of the rotor due to the actuator member reaching the second abutment; or
  - blocking of the rotor due to seizing during travel of the actuator member towards the first abutment; or
  - blocking of the rotor due to seizing during travel of the actuator member towards the second abutment,
- wherein blocking of the rotor due to seizing during travel of the actuator member towards the first abutment is detected:
- if the position of the actuator member is substantially less than the position of the second abutment and substantially greater than the position of the first abutment; and
- if an absolute value of the travel speed of the actuator member is less than a predetermined minimum travel speed threshold; and
- if an absolute value of the difference between predetermined minimum torque threshold and torque setpoint for transmitting to the actuator member is substantially zero for at least a predetermined time interval, the predetermined minimum torque threshold being a negative value; and
- if an order to move the actuator member towards the first abutment is active, which order is representative of a travel direction of the actuator member.

* * * * *